(12) United States Patent
Honeyman et al.

(10) Patent No.: US 11,903,342 B2
(45) Date of Patent: Feb. 20, 2024

(54) AUTO REEL HEIGHT

(71) Applicant: AGCO Corporation, Duluth, GA (US)

(72) Inventors: Friedrich Robert Honeyman, Hesston, KS (US); Daniel Dreyer, Hesston, KS (US); Mark Glade, Hesston, KS (US)

( * ) Notice: Subject to any disclaimer, the term of this patent is extended or adjusted under 35 U.S.C. 154(b) by 657 days.

(21) Appl. No.: 16/973,387

(22) PCT Filed: May 22, 2019

(86) PCT No.: PCT/IB2019/054223
§ 371 (c)(1),
(2) Date: Dec. 8, 2020

(87) PCT Pub. No.: WO2019/234539
PCT Pub. Date: Dec. 12, 2019

(65) Prior Publication Data
US 2021/0243954 A1    Aug. 12, 2021

Related U.S. Application Data

(60) Provisional application No. 62/682,185, filed on Jun. 8, 2018.

(51) Int. Cl.
*A01D 57/04* (2006.01)
*A01D 61/00* (2006.01)
*A01D 61/02* (2006.01)

(52) U.S. Cl.
CPC .......... *A01D 57/04* (2013.01); *A01D 61/004* (2013.01); *A01D 61/02* (2013.01)

(58) Field of Classification Search
CPC ...... A01D 57/04; A01D 61/004; A01D 61/02; A01D 34/283; A01D 57/02
See application file for complete search history.

(56) References Cited

U.S. PATENT DOCUMENTS

| 5,488,817 | A | * | 2/1996 | Paquet | ............... | G05B 19/0423 |
| | | | | | | 56/10.2 R |
| 6,389,785 | B1 | | 5/2002 | Diekhans et al. | | |
| 2006/0213168 | A1 | * | 9/2006 | Remillard | .............. | A01D 57/02 |
| | | | | | | 56/10.2 R |
| 2007/0130898 | A1 | * | 6/2007 | Dueckinghaus | ....... | A01D 69/03 |
| | | | | | | 56/10.1 |

(Continued)

FOREIGN PATENT DOCUMENTS

| EP | 1510123 B1 | 1/2007 |
| EP | 2 681 984 A1 | 1/2014 |

(Continued)

OTHER PUBLICATIONS

UK Intellectual Property Office, Search Report for related UK Application No. GB1810906.6, dated Dec. 24, 2018.

(Continued)

*Primary Examiner* — Rodney A Butler

(57) ABSTRACT

In one embodiment, a computer-controlled method for adjusting a height of a header reel, the method comprising: measuring a rotational speed of the reel; measuring a force opposing rotation of the reel; determining a target load for the reel based on the measured rotational speed and the measured force and a first input; and causing movement of the reel according to the target load based on a change in load on the reel.

20 Claims, 12 Drawing Sheets

(56) References Cited

U.S. PATENT DOCUMENTS

2016/0078304 A1    3/2016  Bremer et al.
2017/0118915 A1    5/2017  Middelberg et al.
2018/0343800 A1*  12/2018  Noll ...................... A01D 41/14

FOREIGN PATENT DOCUMENTS

| EP | 2 767 152 A2 | 8/2014 |
| EP | 3087819 A2 | 11/2016 |
| EP | 3 132 711 A1 | 2/2017 |
| EP | 3 300 580 A1 | 4/2018 |
| EP | 3 305 058 A1 | 4/2018 |
| GB | 1303311 A | 1/1973 |
| WO | 2014/156675 A1 | 10/2014 |

OTHER PUBLICATIONS

European Patent Office, International Search Report for related International Application No. PCT/IB2019/054223, dated Sep. 5, 2019.

* cited by examiner

| SPEED | PRESSURE | LOAD |
|---|---|---|
| S1 | P1 | L1 |
| S1 | P2 | L2 |
| S1 | P3 | L3 |
| S1 | PN1 | LN1 |
| . . | . . | . . |
| SN | PNN | LNN |

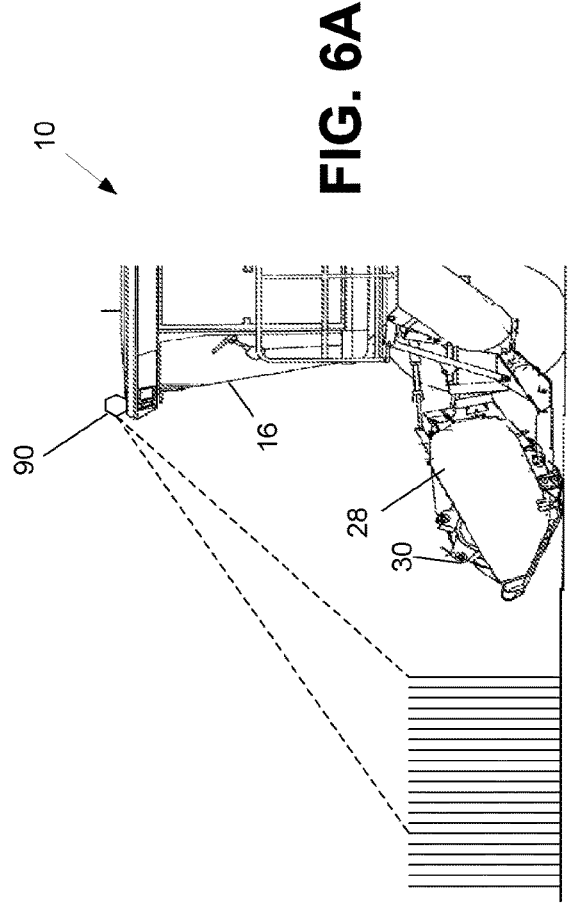
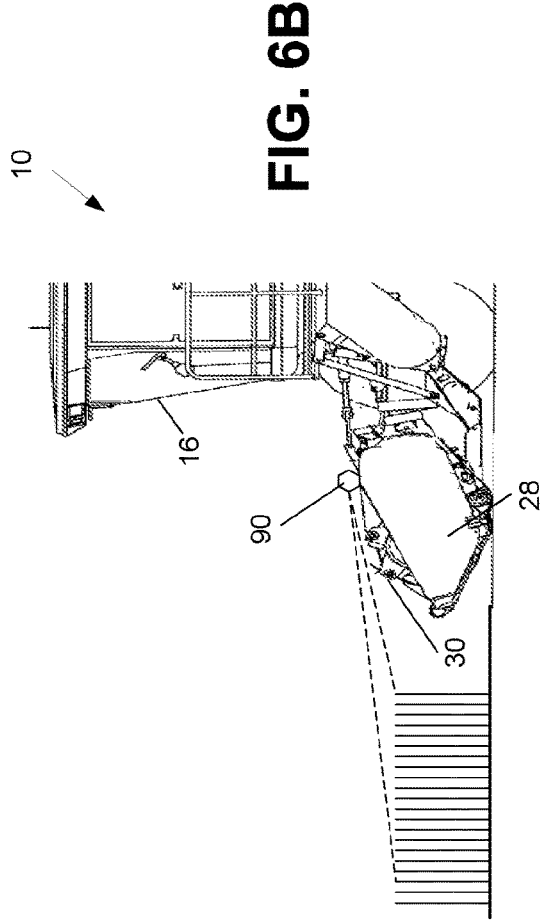

AUTO REEL HEIGHT

TECHNICAL FIELD

The present disclosure is generally related to agricultural machines and, more particularly, control of implement function for implements operatively coupled to agricultural machines.

BACKGROUND

Many advances have been achieved recently in precision farming, including the use of on-board positioning devices (e.g., global positioning system (GPS) receivers) to enable autonomous or semi-autonomous traversal of fields, radar devices to enable obstacle detection and/or generation of field and yield maps, among others technologies. Such achievements help reduce operator fatigue while enabling efficient farming. However, the operator still plays an important role in ensuring the agricultural machine and associated implements operate as expected, even during computer-assisted farming. For instance, certain crops may pose challenges during harvesting operations that require the operator to control machine or implement function. As one example, when cutting thick crops such as canola with a windrower equipped with a draper header, significant effort is exerted by an operator in maintaining proper reel height. Crop height varies significantly, and will not flow correctly into the header if the reel height is positioned incorrectly. Positioning of the reel height may occur quite frequently in a field, which may result in considerable operator fatigue and different results depending on the skill level of the operator.

BRIEF DESCRIPTION OF THE DRAWINGS

Many aspects of certain embodiments of the disclosure can be better understood with reference to the following drawings. The components in the drawings are not necessarily to scale, emphasis instead being placed upon clearly illustrating the principles of the present systems and methods. Moreover, in the drawings, like reference numerals designate corresponding parts throughout the several views.

FIGS. 6A-6B are schematic diagrams that illustrate in fragmentary, left side elevation views various embodiments of a reel height adjustment system that replaces, or supplements, measurements of pressure, speed, and load with stereoscopic imaging of the crop height.

DESCRIPTION OF EXAMPLE EMBODIMENTS

Overview

Figure 1:
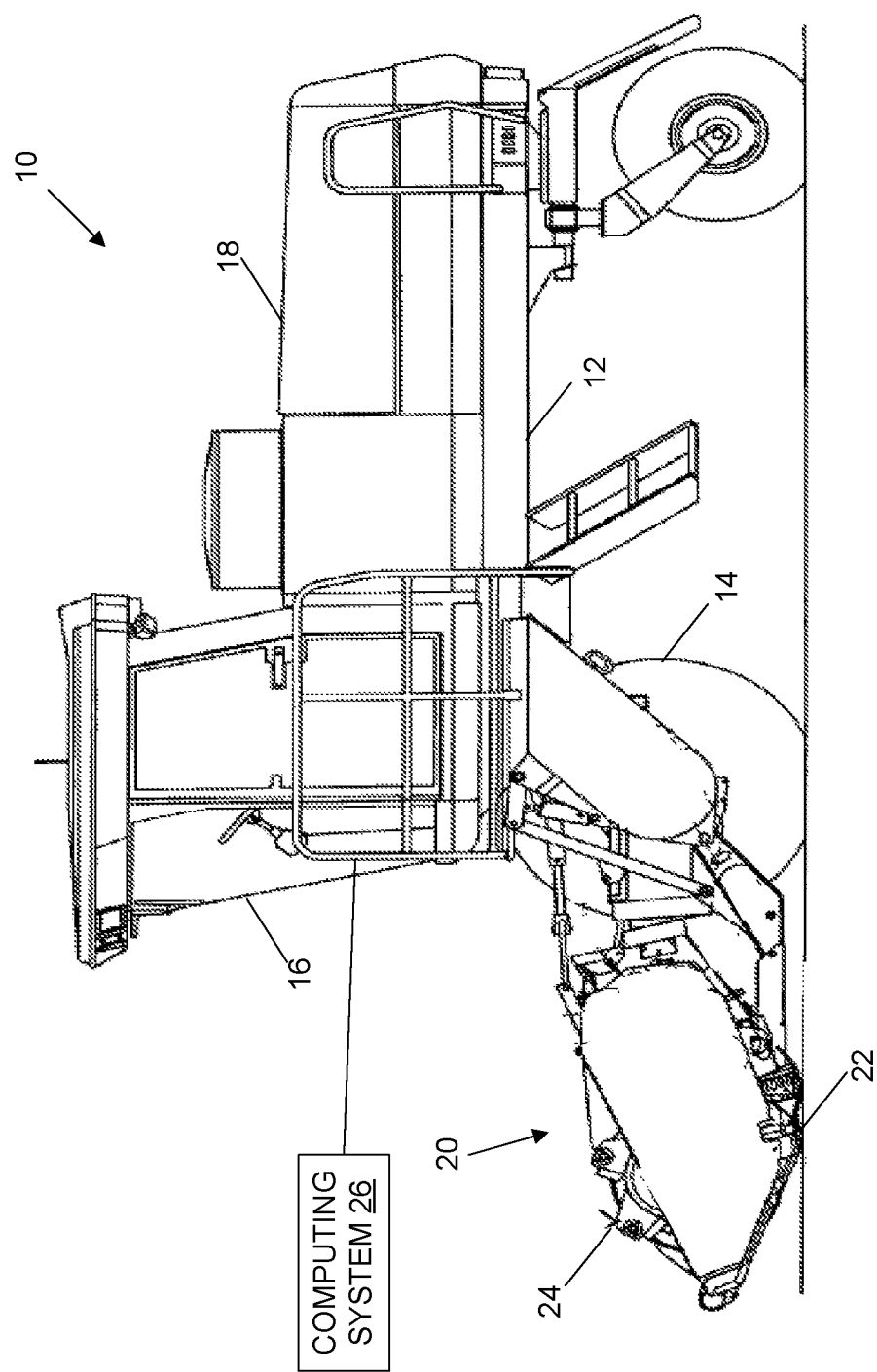
FIG. 1 is a schematic diagram that illustrates, in side elevation view, an example agricultural machine for which an embodiment of a reel height adjustment system may be implemented.

In one embodiment, a computer-controlled method for adjusting a height of a header reel, the method comprising: measuring a rotational speed of the reel; measuring a force opposing rotation of the reel; determining a target load for the reel based on the measured rotational speed and the measured force and a first input; and causing movement of the reel according to the target load based on a change in load on the reel.

Detailed Description

Certain embodiments of a reel height adjustment system and method are disclosed that enable closed-loop control of reel height with reel speed to maintain a consistent or near consistent feed of the harvested crop. In one embodiment, reel speed is measured from a sensor and drive pressure is measured and adjusted to maintain the speed at a desired setpoint (either fixed or varying with forward velocity) to ensure a consistent or near consistent feed of the harvested crop into the machine. One benefit to this approach is that the crop material falls on an auger or belt(s) in a desired manner to improve productivity. In one embodiment, the speed is compared to a table of expected values for the output. Higher loads require more pressure to create the same speed. A load (target load) is derived based on the measured pressure and speed, and used to adjust the reel height. In some embodiments, the reel height is adjusted until it reaches or approximates the target load. In some embodiments, the reel height is adjusted until it falls within a load window as specified by upper and lower setpoints. Note that the adjustment does not override the user adjustment of the reel height, but rather, adds to it. The automated mechanisms of certain embodiments of the reel height adjustment system may be paused whenever the user adjusts the height manually. The target load setpoint may be derived from either the last load (historical data) resulting from height and speed adjustment, or by numeric adjustment (e.g., an operator entering or selecting a value at a user interface).

In some embodiments, reel height adjustment, and/or adjustment of other header parameters (e.g., change of speed of the reel and/or other rotating mechanisms of the header), collectively and generally referred to also as an adjustment in movement of the header components, may be based on electromagnetic-based crop feature detection (e.g., by sensing a change in electromagnetic fields based on interaction with the crop) in lieu of, or in addition to, the load-based determination explained above. In one embodiment, one or more sensors may be mounted to the front of the header to create one or more beams of microwaves, light, infrared, or radiation from other ranges of the electromagnetic spectrum. The one or more beams are interrupted by the crop and gives an indication of the crop height and/or other crop features. This data can be used in addition to, or in place of, previously described rotational speed/load values-based determinations for adjustment of reel height and/or adjustments in other header and/or machine parameters.

In some embodiments, one or more sensors may be mounted to the front of the header to measure relative capacitance, radiative reflectance, or relative absorbance of radio waves, microwaves, light, infrared, or other forms of radiation. The comparison of values at different heights provides an indication of an approximate crop height. This data may also provide other or additional crop features, including crop moisture and/or nutrient data. This data can be used in addition to, or in place of, previously described reel height adjustment methods for adjusting one or more header and/or machine parameters.

In some embodiments, one or more cameras may be used with image processing and or machine learning software to determine one or more crop features, including crop height and/or contour of the crop. Such imaging may also be used for detecting field obstacles and/or crop type for prompting a change in other machine/header settings. For instance, detection of crop height/density changes may be used to infer headlands, where certain embodiments may responsively provide adjustments to reel height and/or reel speed. This data can be used in addition to, or in place of, previously described reel height adjustment methods.

Automating reel height adjustment has the potential of reducing the amount of effort needed to operate a reel (e.g., of a draper or auger header) and/or other machine functions, and thus can reduce operator fatigue.

Note that the various embodiments described above may be used alone or in any combination based on one or more factors, including field/environmental conditions, machine type and or capabilities, and/or operator desires/objectives. Each method may have certain strengths that are used to advantage by the operator. For instance, time-of-flight (TOF) technology presents some challenges when observing crops that have significant variance in the height. In contrast, using image processing on single or multiple standard cameras may provide a much better representation of the effective crop height. Further, using load sensing has the advantage of being able to account for resistance that is not consistent with the height of the crop, but caused by other factors like crop growth direction, moisture, crop entanglement, etc.

Having summarized certain features of a reel height adjustment system of the present disclosure, reference will now be made in detail to the description of a reel height adjustment system as illustrated in the drawings. While an example reel height adjustment system will be described in connection with these drawings, there is no intent to limit it to the embodiment or embodiments disclosed herein. For instance, though emphasis is placed on a self-propelled windrower with a draper or auger header attached, other machines (e.g., a combine harvester) may be used that are self-propelled, drawn by another vehicle, and/or of a different type of implement design, and hence are contemplated to be within the scope of the disclosure. For instance, balers use a reel as well, albeit in a different configuration than a windrower, where the pickup function may benefit from certain embodiments by having the ability to handle different windrow heights. As another example, though emphasis is on reel control, certain embodiments of a reel height adjustment system may be used to influence other rotational mechanisms of the header, such as to control in similar manner a top auger to facilitate an improved feed of crop. Further, although the description identifies or describes specifics of one or more embodiments, such specifics are not necessarily part of every embodiment, nor are all of any various stated advantages necessarily associated with a single embodiment. On the contrary, the intent is to cover all alternatives, modifications and equivalents included within the principles and scope of the disclosure as defined by the appended claims. Further, it should be appreciated in the context of the present disclosure that the claims are not necessarily limited to the particular embodiments set out in the description.

Note that references hereinafter made to certain directions, such as, for example, "front", "rear", "left" and "right", are made as viewed from the rear of the windrower looking forwardly.

Reference is made to FIG. 1, which illustrates an example agricultural machine for which an embodiment of a reel height adjustment system may be implemented. The machine is depicted in FIG. 1 as a self-propelled windrower 10 with an auger header as an example implement attached thereto, though one having ordinary skill in the art should appreciate in the context of the present disclosure that other self-propelled, or pull-type, windrower designs with the same or different style headers (e.g., draper header), and/or other types of agricultural machines may be used with the same or different reel-equipped header, and hence are contemplated to be within the scope of the disclosure. The windrower 10 is generally operable to mow and collect standing crop in the field, condition the cut material to improve its drying characteristics, and then return the conditioned material to the field in a windrow or swath. The windrower 10 may include a chassis or frame 12 supported by wheels 14 (although tracks may be used in some embodiments, or other configurations in the number and/or arrangement of wheels may be used in some embodiments) for movement across a field to be harvested. The chassis 12 supports a cab 16, within which an operator may control certain operations of the windrower 10, and a rearwardly spaced compartment 18 housing a power source (not shown) such as an internal combustion engine. The chassis 12 also supports a ground drive system that, in one embodiment, when powered by the engine, causes differential rotation of the wheels (e.g., increasing the speed of one wheel while decreasing the speed of the opposite wheel) according to a dual path steering mechanism as is known in the art. In some embodiments, other mechanisms for enabling navigation and/or traversal of the field may be used.

A coupled working implement, depicted in FIG. 1 as a harvesting header 20 (e.g., auger header, though draper header may be used), is supported on the front of the chassis 12 in a manner understood by those skilled in the art. The header 20 may be configured as a modular unit and consequently may be disconnected for removal from the chassis 12. As is also known in the art, the header 20 has a laterally extending crop cutting assembly 22 in the form of a reciprocating sickle for severing standing crop from the ground, one or more rotating reels 24 for sweeping the standing crop into the sickle 22 to improve cutoff, and one or more conveyors (e.g., augers, slats, elastomeric endless belts, etc., not shown in FIG. 1) that converge the severed crop centrally for deposit on the ground as the windrower 10 advances. Note that some embodiments may comprise a crop conditioning assembly (e.g., for the auger header 28) in the form of one or more pairs of transverse rollers as is known. The windrower 10 also comprises a computing system 26, which is coupled to a control system that monitors various parameters (e.g., pressure, speed) and/or crop features (crop height, density, contour, etc.) and provides for the adjustment of the height of the reel 24 (and/or other parameters, such as reel speed) based on the monitored parameters and/or features as explained further below.

Figure 2A:
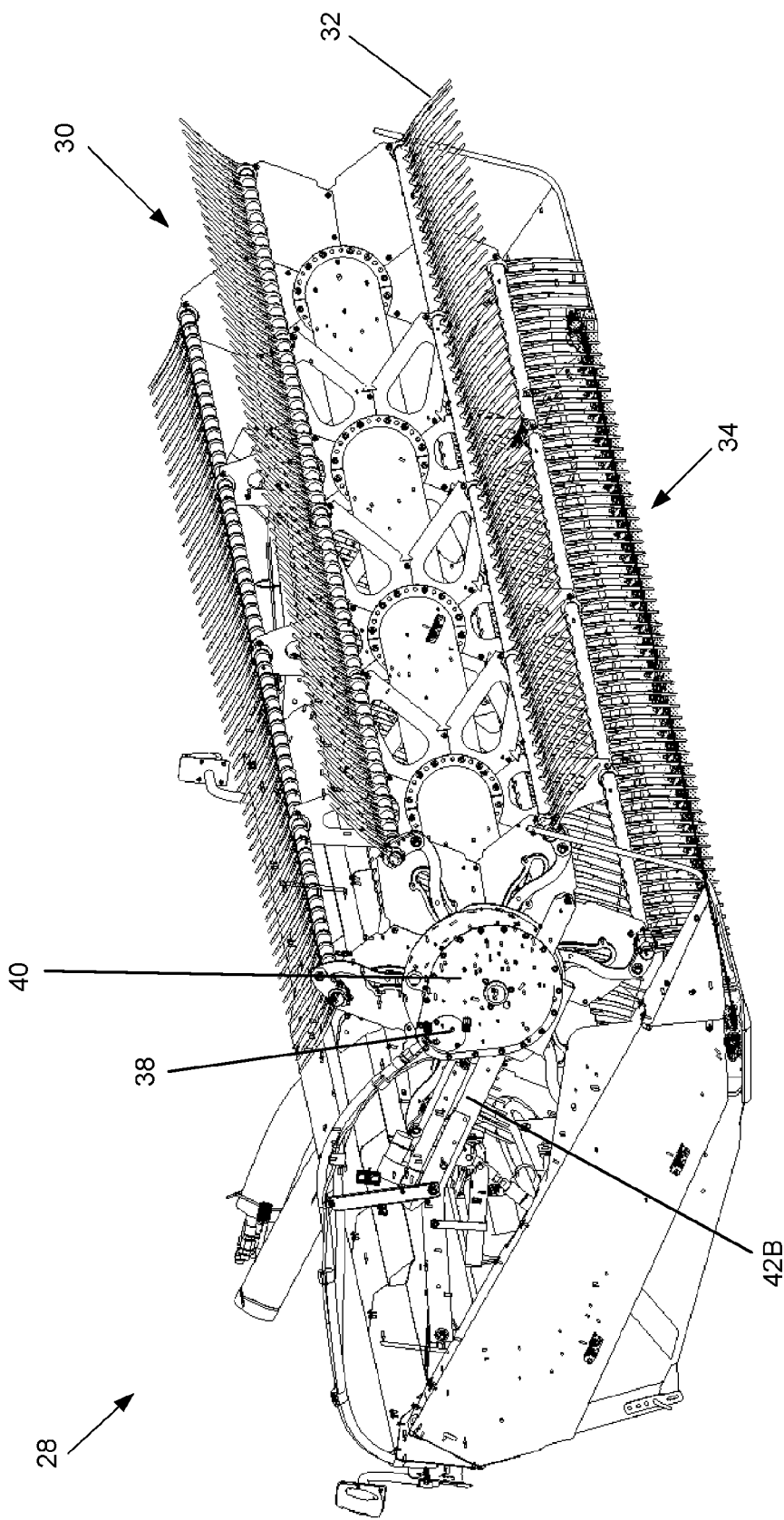
FIG. 2A is a schematic diagram that illustrates, in front right perspective view, a header coupled to the agricultural machine of FIG. 1 and comprising a reel that is adjusted in height by an embodiment of a reel height adjustment system.
Figure 2B:
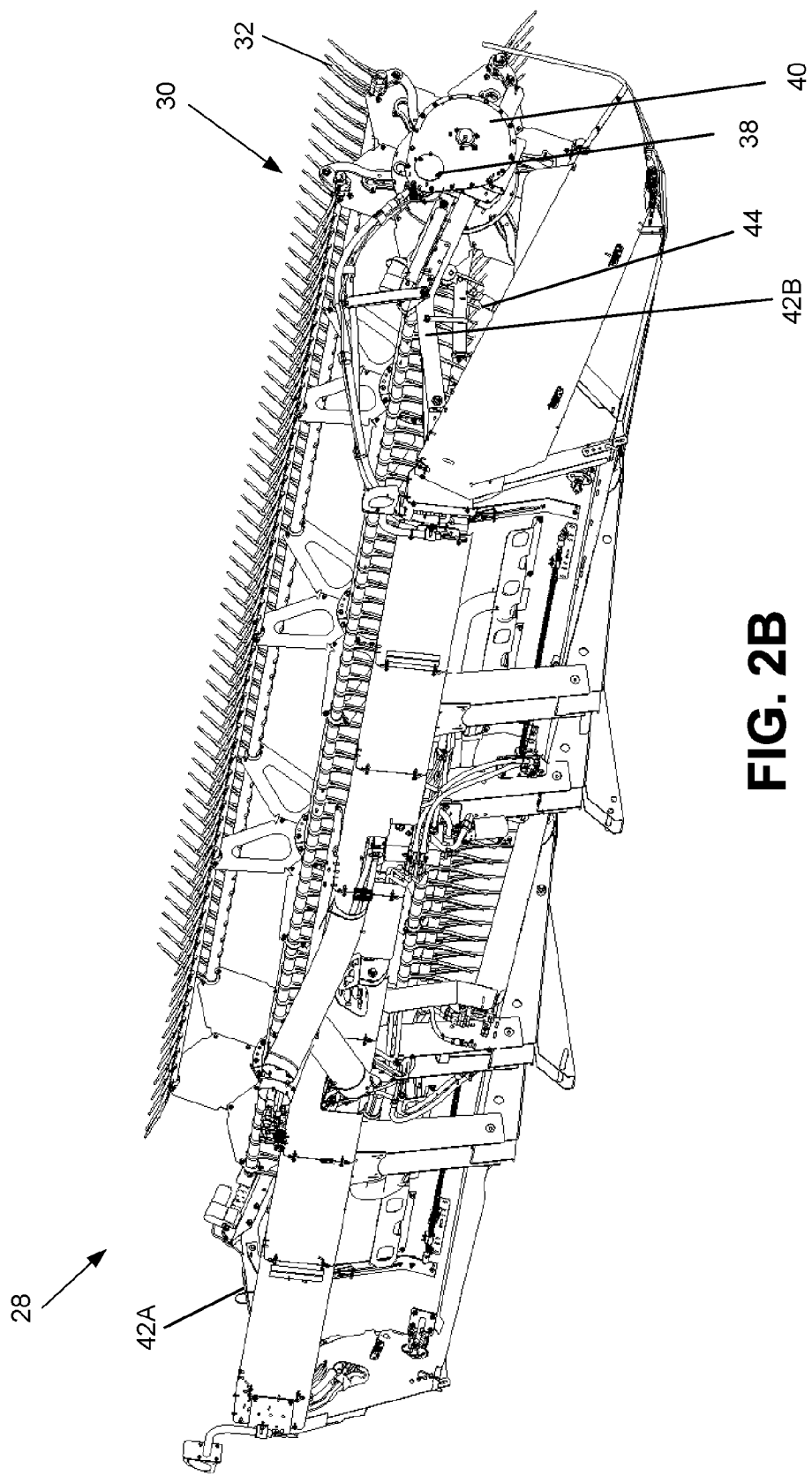
FIG. 2B is a schematic diagram that illustrates, in rear right perspective view, the header of FIG. 2A.
Figure 2C:
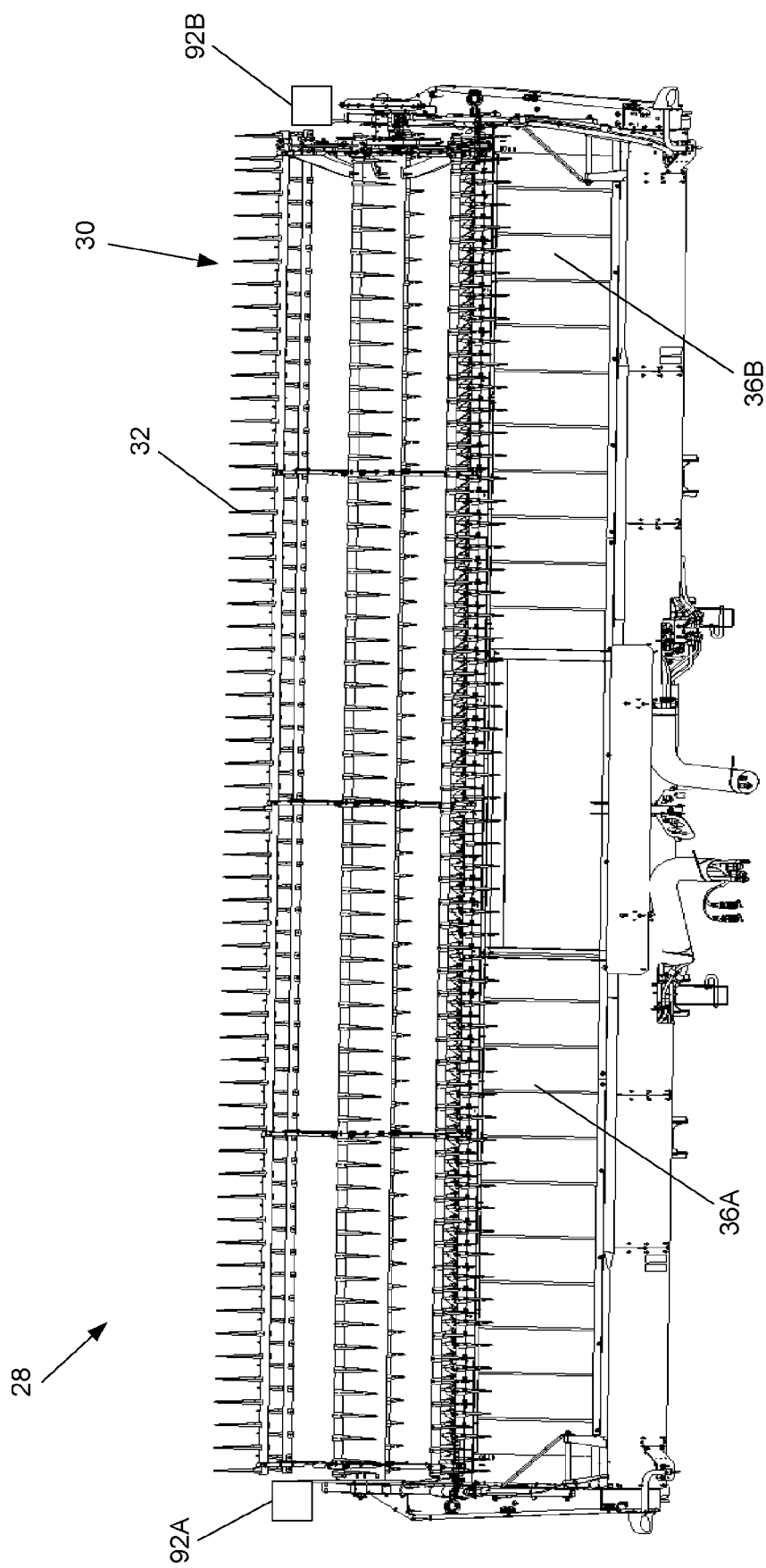
FIG. 2C is a schematic diagram that illustrates, in overhead plan view, the header of FIGS. 2A-2B.

FIGS. 2A-2C are schematic diagrams that illustrate various views of a header 28 (e.g., draper header) comprising a reel 30 that is adjusted in height by an embodiment of a reel height adjustment system. In one embodiment, the header 28 may be used in place of the header 20 of FIG. 1, and the reel 30 may be used in place of the reel 24 of FIG. 1. The header 28 comprises, in this example, a single reel 30 that extends transversely to the direction of forward travel of the windrower 10. In some embodiments, more than a single reel 30 may be used, wherein operation of each reel is either under independent control, or operation of all reels is under common control. As is known, the reel 30 comprises plural transverse rows of tines 32 that, upon rotation of the reel 30, pull crop toward an underlying, transverse crop cutting assembly 34 (see, e.g., FIG. 2A) for performing severing actions on the crop. The crop cutting assembly 34 may be used in place of the crop cutting assembly 22 of FIG. 1 in some embodiments. In some embodiments, the row of tines 32 moves toward the cutter 34 at a constant pace as the cutter 34 moves toward the crop, and in some embodiments, at a variable pace. The severed crop is drawn toward the center of the header 28 by plural conveyors 36A and 36B, beneath where the severed crop is dropped to the ground in a swath or windrow. Note that the draper style header does not have shields or a conditioner, whereas auger-style headers may possess conditioner rolls, forming shields, and optionally a swathboard to influence the manner of deposit of harvested crop onto the field.

The reel 30 comprises part of a reel assembly, the reel assembly further including a reel drive system that drives the rotation of the reel. The reel drive system includes a hydraulic circuit that in one embodiment includes a hydraulic pump, hydraulic motor 38 and a chain-drive 40 (best shown in FIGS. 2A-2B), all fluidly coupled via tubing (e.g., plastic, rubber, and/or metal). Note that some embodiments may replace the chain drive 40 with other known mechanisms, including a direct drive, gear box, belt drive, or variable sheave belt drive, or in some embodiments, removed entirely in place of the pump directly coupled to the reel. In one embodiment, the motor 38 is fed with hydraulic fluid flowing within the hydraulic circuit from a hydraulic pump (not shown), which is driven by the power source of the windrower 10 (FIG. 1). The hydraulic pump may be embodied as a non-positive displacement or positive displacement pump (e.g., fixed or variable). The fluid flow influenced by operation of the pump is regulated by one or more control valves (not shown) having a valve body with a poppet or spool assembly that couples to and physically controls a disc, ball, globe, etc. to control the hydraulic fluid flow through an orifice. In some embodiments, the aforementioned valve assembly may be realized in one of various forms, including in the pump, as a bypass in the motor, or as a separate component. Control of the poppet or spool may be achieved by a respective actuator (e.g., solenoid, motor, etc.) that is powered by one of a variety of different motive forces, including electrical, magnetic, electromagnetic, hydraulic, or pneumatic energy sources. The control valve actuator is actuated via signalling from the computing system 26 (FIG. 1), where control may be achieved via on/off or proportional type control. In some embodiments, a variable displacement pump may be used, and hence the control valve(s) may be omitted. In some embodiments the power may be sourced via other means, including from either an existing powered shaft or an electric drive. Reel speed may then be varied by a form of variable transmission, or in the case of an electric drive, by adjusting the current, duty, voltage, or frequency of the motor. The motor 38 operates in conjunction with the chain drive 40 to drive a driveline (not shown) coupled (e.g., via a U-joint) to a shaft of the motor 38 and the reel hub (e.g., connection via bearings, as is known). In some embodiments, the reel drive system may be arranged on one side of the reel 30 to cause reel rotation. In some embodiments, plural reel drive systems may be used, such as on each end of the reel 30 (e.g., coupled together for concurrent operation or redundancy) or for each respective reel (e.g., for reel assemblies with multiple reels) for concurrent (e.g., peer-to-peer) or independent control.

Also shown are carrier arms 42 (e.g., 42A, 42B). Though plural carrier arms 42 (e.g., two) are depicted, as best shown in FIG. 2B, additional or fewer carrier arms may be used in some embodiments. The carrier arms 42 are coupled between the frame of the header 28 and the reel 30, and enable the reel 30 to be moved (e.g., raised and lowered) via use of one or more cylinders 44. In the example of FIG. 2B, one cylinder 44 (right side) is shown coupled between the frame of the header 28 and the right-side carrier arm 42B, though another cylinder (not shown) may be coupled between the frame of the header 28 and the left-side carrier arm 42A. Control of the cylinders 44 is achieved via one or more control valves equipped with actuators (e.g., electrical, magnetic, electromagnetic, hydraulic, pneumatic) that receive signals from the computing system 26 and responsively cause a poppet or spool change to alter the valve body orifice (e.g., via paddle, globe, ball, etc.), enabling the control of hydraulic fluid through the control valve body, which in turn causes a change in flow (and hence change in pressure) in the cylinders 44.

Figure 3:
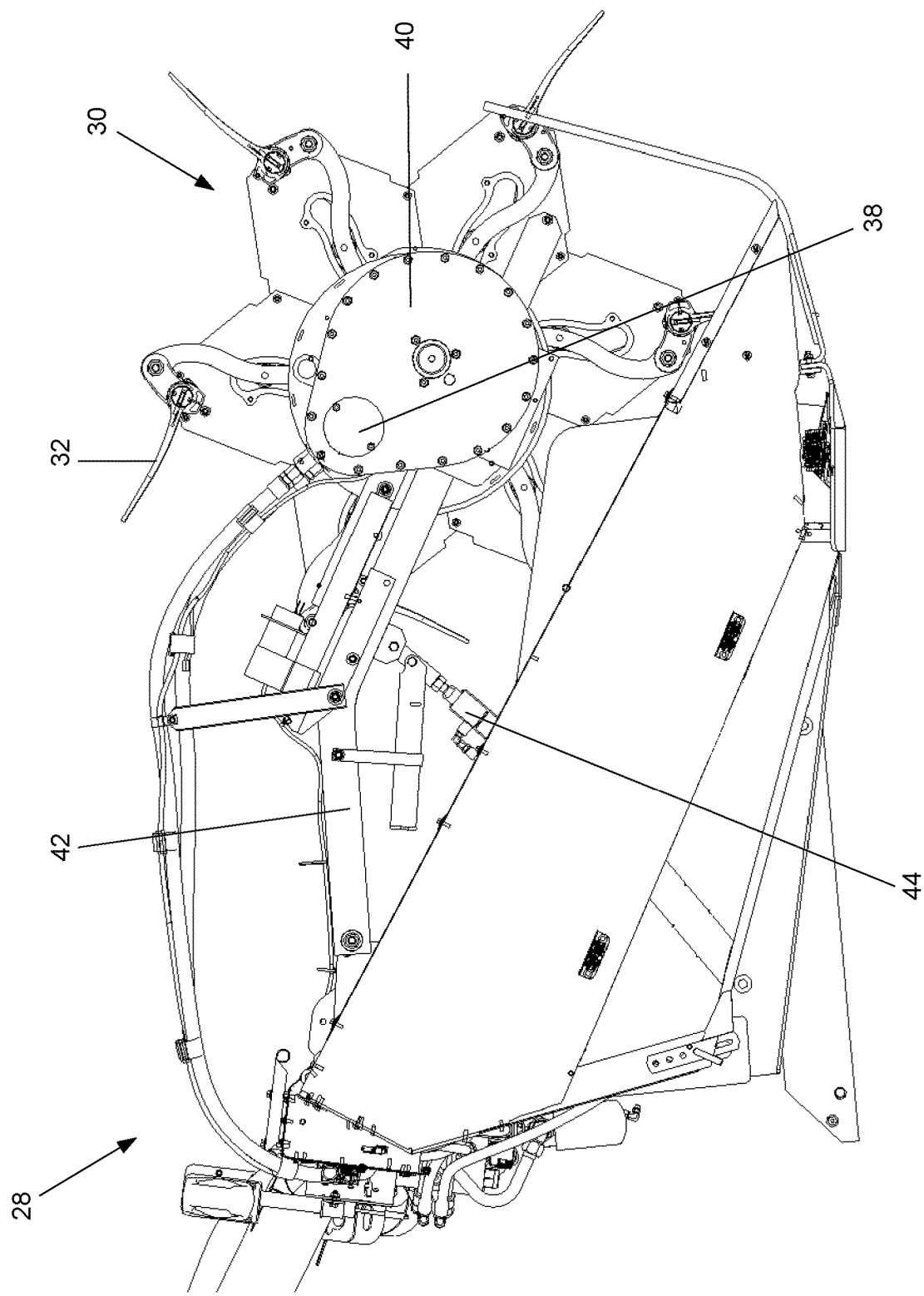
FIG. 3 is a schematic diagram that illustrates, in right side elevation view, the header of FIGS. 2A-2C comprising a reel that is adjusted in height by an embodiment of a reel height adjustment system.

With continued reference to FIGS. 2A-2B, FIG. 3 shows a side elevation view of the header 28 equipped with the reel 30, including how one of the cylinders 44 couples in known manner between the header frame and one of the carrier arms 42 to enable the raising and lowering of the reel 30. Other components described above are shown, but discussion omitted for brevity. Further, description for some known components not shown are omitted here for brevity. For instance, the carrier arms 42 may be equipped in some embodiments with a saddle-like assembly that allows the reel to move in fore-and-aft manner. A shaft runs through the saddle-like assembly and is coupled to a bulkhead inside the reel. In one embodiment, the cylinders 44 comprise hydraulic, piston-style linear, double-acting cylinders, though in some embodiments, pneumatic, electrical, or electromagnetic style cylinders may be used in some embodiments. In some embodiments, the cylinders may be of a rotary style. In one embodiment, the cylinders 44 are arranged in parallel (e.g., commonly plumbed), enabling concurrent operation. In some embodiments, the cylinders 44 may be arranged for independent operation (e.g., where there are plural corresponding reels for independent height adjustment). In one embodiment, the reel height adjustment may be enabled via a hydraulic circuit that includes a hydraulic pump and control valves (not shown) that, upon receiving signalling by the computing system 26 (FIG. 1), enables a change in fluid flow through the control valve bodies and consequently through the hydraulically coupled cylinders 44, which in turn enables extension or retraction of a respective rod coupled to the piston based on the change in pressure resulting from the change in fluid flow. As hydraulic cylinder operation is known, further discussion is omitted here for brevity.

Figure 4A:
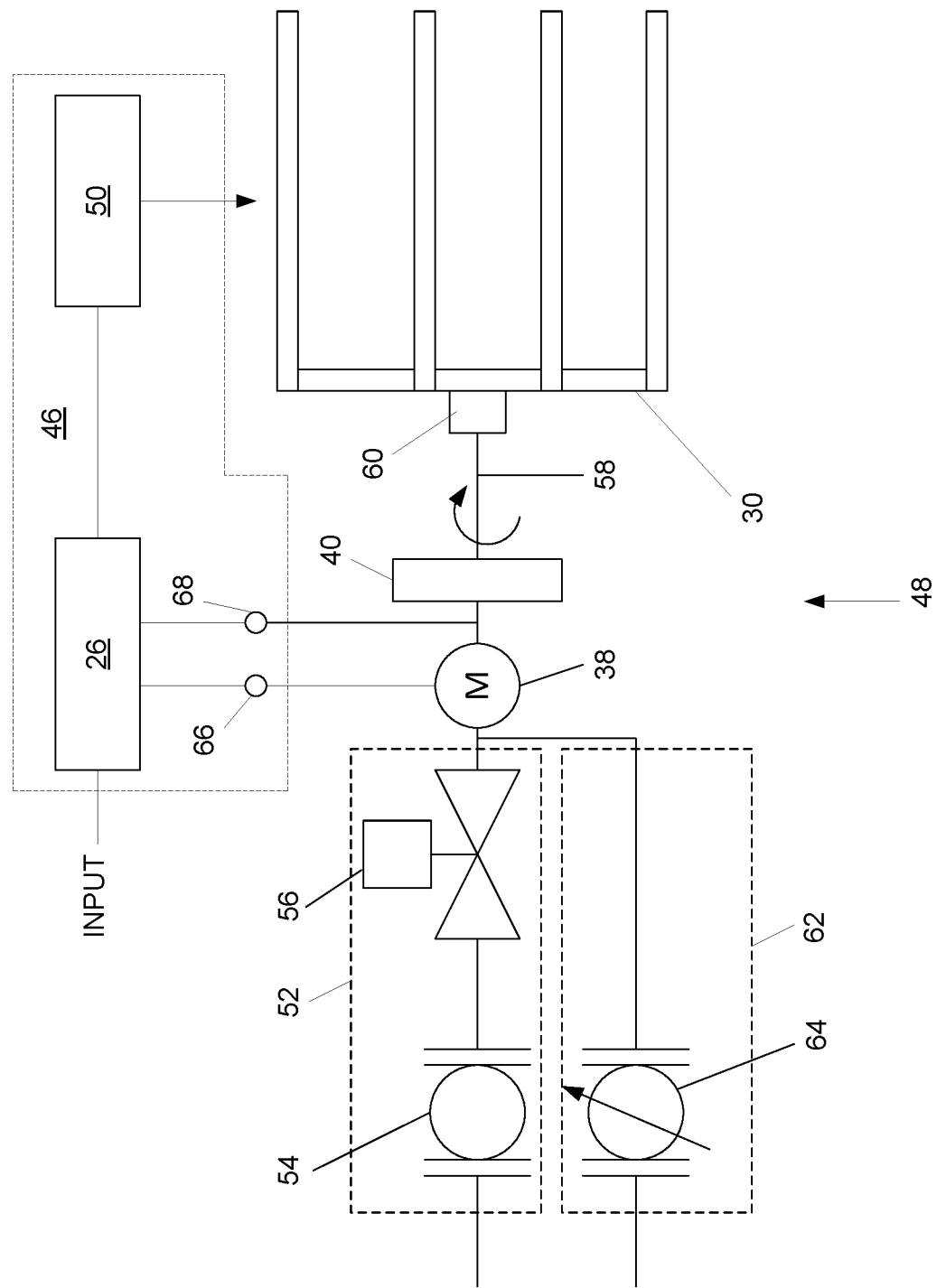
FIG. 4A is a schematic diagram that conceptually illustrates an embodiment of an example control system used in cooperation with a reel drive system and reel lift system of an embodiment of a reel height adjustment system.

Referring now to FIG. 4A, shown is a conceptual illustration of an embodiment of a example control system 46 used in cooperation with a reel drive system 48 and a reel lift system 50 of an embodiment of a reel height adjustment system. It should be appreciated that the control system 46 is an example of one embodiment, and that some embodiments may have fewer or different components to achieve the same or similar function. In one embodiment, a reel assembly includes the reel 30 and the reel drive system 48. The reel drive system 48 may include a first hydraulic subsystem 52 comprising a hydraulic pump 54 and at least one control valve 56, the first hydraulic subsystem 52 coupled to the motor 38, which in turn is coupled to the chain drive 40. The chain drive 40 is operatively coupled to a driveline 58, which in turn couples to the reel 30 via a bearing assembly 60. In some embodiments, the first hydraulic subsystem 52 may be replaced with a second hydraulic subsystem 62 comprising a variable displacement hydraulic pump 64, the second hydraulic subsystem 62 coupled to the motor 38, with the balance of the components configured similarly to that described above.

In some embodiments, the chain drive 40 may either be omitted or replaced by another form of mechanical transmission, and/or the motor 38 may be replaced by a variable bypass hydraulic motor, an auxiliary powered shaft with a variable transmission, or electric motor.

The control system 46 incudes the computing system 26 and plural sensors, including at least a first sensor 66 and a second sensor 68. The first sensor 66 is configured to measure (directly or indirectly) the rotational speed of the reel 30. In one embodiment, the first sensor 66 is mounted to the outside of the motor 38 and monitors the motor output shaft rotation. In some embodiments, the first sensor 66 may be positioned elsewhere, including at any location between the motor 38 and the reel 30 (e.g., proximal to the chain drive 40, the driveline 58, etc.). The first sensor 66 may be a Hall effect sensor, magnetic encoder, or in general any sensor that is based on magnetic reluctance (e.g., where a gear tooth passes by a coil and the changes in the magnetic field are detected). In one embodiment, the first sensor 66 may provide an output that comprises a frequency of pulses or indication of angular rotation that the computing system 26 uses to derive the speed of rotation using known equations. In some embodiments, the computing system 26 may use time, voltage, or current to determine speed. In some embodiments, the first sensor 66 may be embodied as an optical sensor (e.g., disposed in, or integrated with, the motor 38), ultrasonic sensor, or other known types of flowrate sensors. Note that in embodiments that use an electric drive, a current or voltage sensor may be used to detect speed indirectly. In some embodiments, some of the processing performed by the computing system 26 may be achieved at the first sensor 66 (and/or the second sensor 26).

The second sensor 68 is configured to measure (directly or indirectly) drive pressure, and may be embodied as a torque sensor (e.g., coupled to the driveline 58), a load cell (e.g., coupled to the motor 38), or a pressure sensor (e.g., pressure transducer) that is coupled between the hydraulic subsystem 52 (or 62 in some embodiments) and the motor 38. Note that variations to the above may be used depending on the system that is deployed. For instance, in electric drive systems, the total power used may be included in the sensed date. Variable sheave drive systems may also use position feedback. In some embodiments, load may also be inferred by phase or time delay in sensed angular position sensors along the drive or end to end along the reel. Though depicted in FIG. 4A as respective single sensors 66 or 68, in some embodiments, multiple sensors of the same or different types may be used for one or both sensing/measuring functions. The computing system 26 is communicatively coupled to the sensors 66, 68 via a wired or wireless connection (not shown).

In one example operation, the control system 46 is configured to receive input (e.g., operator input) corresponding to a reel setting for movement (e.g., reel height adjustment), measure speed and drive pressure (e.g., opposition force placed on the reel 30) from the sensors 66, 68, respectively, in operations at the reel setting, and determine a corresponding target load and in some embodiments, a window of minimum and maximum reel height setpoints. Note that movement of the reel is described in terms of height adjustment, but in some embodiments, other and/or additional movement may be realized. For instance, the carrier arms may be moved in a fore-and-aft manner as described above, which may be used based on the manner in which the crop is laying on the field. To maintain a certain rotational speed under varying load conditions while the windrower 10 (FIG. 1) traverses a field engaging crops during harvesting operations, drive pressure needs to be adjusted. Thus, changes in crop conditions result in changes in load requiring changes in pressure to meet the load while maintaining the rotational speed of the reel 30. The computing system 26 continually receives feedback from the sensors 66, 68 and adjusts the reel height via signaling to the reel lift system 50 based on the speed and pressure measurements to maintain operations at or around the target load and/or within the window.

Figures 4B, 4C:
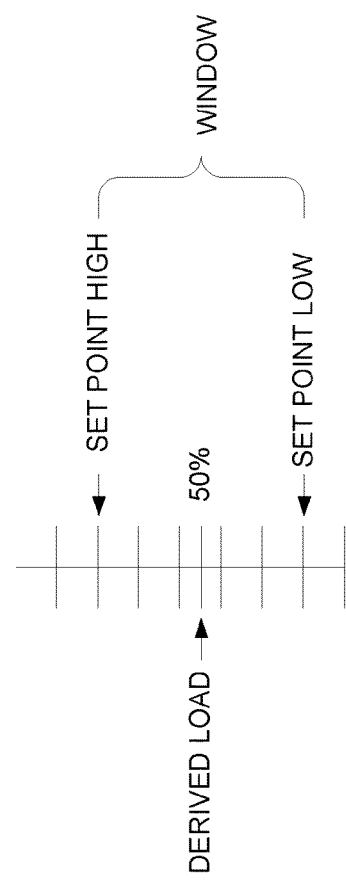
FIG. 4B is a schematic diagram that illustrates an example data structure of permissible pressure, speed, and load values that the control system uses to generate a window within which to constrain reel height adjustments for an embodiment of a reel height adjustment system.
FIG. 4C is a schematic diagram that conceptually illustrates an example target load and window determination performed by a computing system of the control system that prescribe the adjustments made to the reel height for an embodiment of a reel height adjustment system.

Referring to FIG. 4B (with continued reference to FIG. 4A), shown is an example data structure 70 (e.g., look up table or LUT) that the computing system 26 may access to determine the load on the reel 30 based on the measurements of speed and pressure for a particular reel height setting. In some embodiments, one or more additional data entries may be used (or alternative data structures may be used) as explained further below. Note that the data structure 70 has a plurality of different speeds (e.g., S1-SN), and for each speed, a plurality of different pressure (e.g., P1-PNN) and load (e.g., L1-LNN) setting combinations. In some embodiments, plural data structures 70 may be used. In some embodiments, one or more parametric equations may be used in place of the data structures 70. As shown in this example, to maintain a certain speed of rotation (e.g., S1) for the reel 30 under varying loads (e.g., L1-LN1), pressure values (e.g., P1-PN1) are prescribed for which the computing system 26 needs to instruct the reel lift system 50 (and in particular, signal control valve actuators for one or more control valves that control fluid flow into and out of the hydraulic cylinders 44 (FIG. 3) for enabling adjustment of the carrier arms 42 (FIG. 3)) to adjust the height of the reel 30 to cause the change in pressure needed to maintain a speed at a given load.

For instance, an operator may drive the windrower 10 (FIG. 1) onto a field, set (e.g., INPUT in FIG. 4A) the height adjustment for the reel 30, and begin field harvesting operations. The computing system 26 receives the input, and speed and pressure input signals from the sensors 66, 68, accesses the data structure 70, and determines a target load and, in some embodiments, a window of reel heights (and corresponding loads) through which the computing system 26 may cause adjustment to attempt to maintain a consistent load at or around the target load or at least within the window, as illustrated conceptually in FIG. 4C. In the depicted example, the target (derived) load is determined, and centered (50%) in a window of reel height setpoint values (which correspond to minimum and maximum loads from the data structure 70), the window providing a range of values within which the computing system 26 attempts to adjust the reel height to approximate the target load when changes to the load occur (e.g., from a change in density or height of crop). Note that the use of a window is optional, the window facilitating an automated mechanism to augment operator commands. In some embodiments, the computing system 26 may be allowed more autonomy, such as to operate freely about the target load (i.e., without the constraints of setpoints for the window).

One example, using FIGS. 4A-4C, is illustrative of an example operation of a reel height adjustment system. After reel height adjustment by an operator from the cab of the windrower 10 (or from a remote location when remote communication of the windrower 10 is available, or automatically or semi-automatically based on historical data for the particular field of operations), the target load and (optional) reel height adjustment window is determined as shown in FIGS. 4B-4C. Assume from the data structure 70 that the target load is L2. While the windrower 10 is traversing the field, assume crop conditions change, leading to a pressure increase (from P2 to P3) corresponding to an increase in the load (from L2 to L3). The computing system 26 senses this change from input received via the sensors 66, 68 and in turn signals the reel lift system 50. The actuator(s) of the reel lift system 50 cause a change in flow to the hydraulic cylinders (e.g. cylinders 44, FIG. 2B), which extends the cylinder rod(s) to push up the carrier arms 42, resulting in a raising of the reel 30. By raising the reel 30, the load on the reel 30 is reduced back to the setpoint or target load (L2). Conversely, assuming operation at L2, if the windrower 10 encounters a change in crop conditions (e.g., less dense, or shorter crop), the pressure drops to P2 based on a corresponding decrease in the load (from L2 to L1). The computing system 26 receives from the sensors 66, 68 an indication of the changed condition, and responsively signals the reel lift system 50 to lower the reel height, which in turn results in the load returning to the setpoint or the target load L2. In effect, the reel height adjustment system attempts to maintain a consistent or near consistent feed of crop to the machine.

Figure 5:
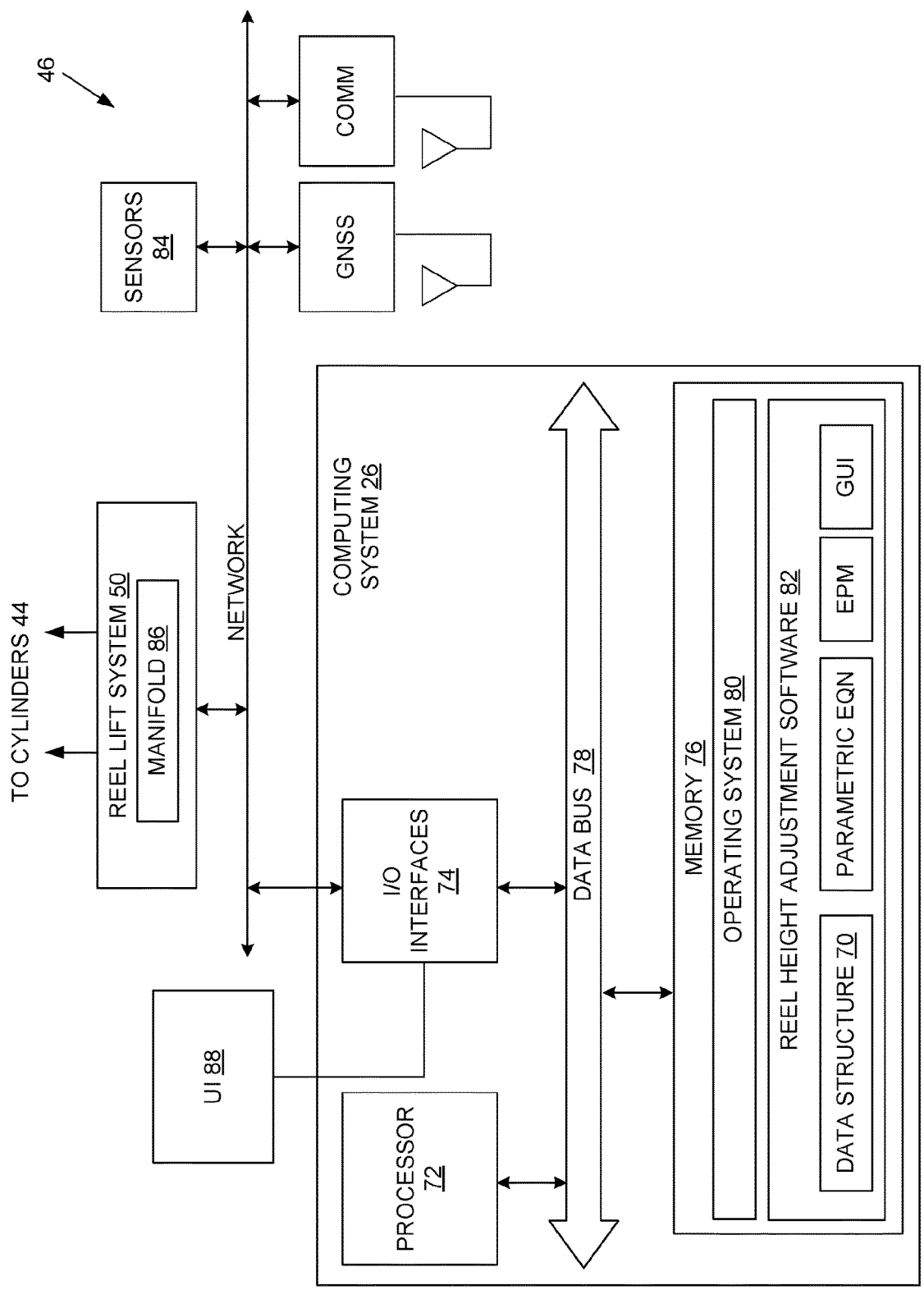
FIG. 5 is a schematic diagram that illustrates an embodiment of an example computing system and some example components of the control system of FIG. 4A.

Attention is now directed to FIG. 5, which illustrates an embodiment of an example computing system 26 that cooperates with the control system 46 to enable closed-loop control of reel speed and height adjustment. One having ordinary skill in the art should appreciate in the context of the present disclosure that the computing system 26 is illustrative of one example, and that some embodiments of computing systems may comprise fewer or additional components, and/or some of the functionality associated with the various components depicted in FIG. 5 may be combined, or further distributed among additional modules and/or computing devices (e.g., plural ECUs), in some embodiments. It should be appreciated that, though described in the context of residing in the windrower 10 (FIG. 1), in some embodiments, one or more of the functionality of the computing system 26 may be implemented in a computing device or devices located internal and external to the windrower 10 or completely external to the windrower 10, as described above. The computing system 26 is depicted in this example as a computer device (e.g., an electronic control unit or ECU), but may be embodied as a programmable logic controller (PLC), field programmable gate array (FPGA), application-specific integrated circuit (ASIC), discrete analog controller, among other devices. In some embodiments, the computing system 26 may comprise two or more devices. It should be appreciated that certain well-known components of computer systems are omitted here to avoid obfuscating relevant features of the computing system 26.

In one embodiment, the computing system 26 comprises one or more processors, such as processor 72, input/output (I/O) interface(s) 74, and memory 76, all coupled to one or more data busses, such as data bus 78. The memory 76 may include any one or a combination of volatile memory elements (e.g., random-access memory RAM, such as DRAM, and SRAM, etc.) and nonvolatile memory elements (e.g., ROM, Flash, hard drive, EPROM, EEPROM, CDROM, etc.). The memory 76 may store a native operating system, one or more native applications, emulation systems, or emulated applications for any of a variety of operating systems and/or emulated hardware platforms, emulated operating systems, etc. In the embodiment depicted in FIG. 5, the memory 76 comprises an operating system 80 and reel height adjustment software 82, which in one embodiment comprises a data structure 70 (described in association with FIG. 4B). In some embodiments, the reel height adjustment software 82 may comprise additional components or modules, including graphical user interface (GUI) software that presents feedback of current reel height, measures of pressure, speed, and/or load, and/or measures of sensed and/or derived crop features (e.g., crop height, crop-top contour, moisture, nutrients, etc.). Other additional modules may include, for instance, a browser, or if located remotely, web-host network software, guidance software, communications software, etc., or in some embodiments, fewer software modules (e.g., combined functionality, omitted functionality) may be employed (or omitted) in the memory 76 or used in additional memory. In some embodiments, a separate storage device may be coupled to the data bus 78 (or to a CAN bus (depicted in FIG. 5 as NETWORK) or other network via I/O interfaces 74), such as a persistent memory (e.g., optical, magnetic, and/or semiconductor memory and associated drives).

The computing system 26 is further coupled to a network that is included as part of the control system 46 illustrated in FIG. 4A. In one embodiment, the network may be configured as a controller area network (CAN) system, such as a network in conformance to the ISO 11783 standard, also referred to as "Isobus". In some embodiments, other proprietary or public (e.g., standards-based) network configurations may be used to enable signaling or communications among devices of the windrower 10 (FIG. 1) and/or external devices, and in some embodiments, all or a portion of the communications may be achieved wirelessly (e.g., via Bluetooth, 802.11, near field communications (NFC), etc.). Coupled to the network are one or more sensors 84, which may include the sensors 66, 68, among other sensors including optical and/or other electromagnetic-based sensors (e.g., non-time of flight (TOF) devices including light beams/strips, stereoscopic imaging devices, and/or TOF devices, including lidar devices, radar devices, moisture height sensors, capacitive sensors, etc.). Note that the use of non-TOF over TOF-based devices may provide an advantage from the perspective of cost while providing a wealth of information with the use of suitable processing power. Some embodiments may use a fusion of different sensor types, and in some crop conditions, the computing system 26 may place more emphasis (e.g., more weight) on the non-load type sensor data than the load-type sensors. Some embodiments may completely exclude the load sensing features in favor of more direct, crop height measurements. Note that the parametric equation and/or LUT may have additional data entries for such conditions. Also coupled to the network may be one or more of global navigation satellite system (GNSS) receivers, real time kinematic (RTK) receivers, communication (COMM) devices (e.g., cellular and/or radio modems), among other devices.

The reel height adjustment software 82 comprises executable code (instructions) that receives and processes plural inputs, and outputs control signals (e.g., on/off signals, proportional control signals) to one or more control valves of a manifold 86 of the reel lift system 50. For instance, as described above, the reel height adjustment software 82 receives drive pressure and reel speed from the sensors 84 (or derives such parameters based on the signals received from the sensors 84), and is also configured to receive additional input (e.g., operator input corresponding to reel height settings, or input autonomously or semi-autonomously accessed from local or remote storage, such as past (historical) reel height settings for a given field identified by the operator or detected using GNSS navigation).

As explained further below, in some embodiments, the input may additionally, or alternatively, include one or more various electromagnetic signal input, including stereoscopic or 3D imaging of the crop to be harvested and/or indications of crop height from interference with a light strip or other electromagnetic-based detection technology. The reel height adjustment software 82 uses the received input to determine a target or derived load and an optional corresponding reel height window within which operation is prescribed. Based on changes in load conditions, the reel height adjustment software 82 communicates with one or more control valves of the manifold 86 to cause a change in flow through the hydraulic cylinders 44, resulting in adjustments to reel height (e.g., to raise or lower the reel height, fore-and-aft movement, etc.) to maintain a substantially consistent operative load on the reel (e.g., operation at or about the target load or within the window). Note that the reel height adjustment software 82 may comprise additional modules (executable code or instructions), including one or more parametric equations (eqn) module and/or an electromagnetic processing module (EPM, and also referred to as simply an electromagnetic module). In one embodiment, the parametric equation module may be used in addition to the data structure 70 (e.g., as a check on the data structure 70 or as a redundant mechanism in case of corruption of the data structure 70), or in lieu of the data structure 70, to generate a target load (and determine pressure and speed parameters) based on variations from the target load. In one embodiment, the parametric equation simulates at least in part one or more various known flow equations (e.g., Bernoulli's equation). The EPM module, in one embodiment, processes images captured from plural cameras of a stereoscopic imaging system mounted on the windrower 10 (FIG. 1) at slightly different locations or perspectives to enable generation of a stereo image from the resulting image pairs, or more particularly, a three dimensional (3D) rendering of the crop to ascertain one or more features of the crop, including the height of the crop and density. In some embodiments, imaging may be achieved via a single packaged unit comprising stereoscopic cameras. Other and/or additional electromagnetic-based crop feature detection may be used in some embodiments. Additional discussion of certain embodiments of the EPM module is described below in conjunction with FIGS. 6A-6B.

Execution of the reel height adjustment software 82 may be implemented by the processor 72 under the management and/or control of the operating system 80. The processor 72 may be embodied as a custom-made or commercially available processor, a central processing unit (CPU) or an auxiliary processor among several processors, a semiconductor based microprocessor (in the form of a microchip), a macroprocessor, one or more application specific integrated circuits (ASICs), a plurality of suitably configured digital logic gates, and/or other well-known electrical configurations comprising discrete elements both individually and in various combinations to coordinate the overall operation of the computing system 26.

The I/O interfaces 74 provide one or more interfaces to the CAN bus (NETWORK) and/or other networks. In other words, the I/O interfaces 74 may comprise any number of interfaces for the input and output of signals (e.g., comprising analog or digital data) for conveyance of information (e.g., data) over one or more networks. The input may comprise input by an operator (local or remote) through a user interface (UI) 88, which may include input from switches and/or controllers from the cab or from other locations on the windrower 10 FIG. 1, and/or receive input from the sensors 84, input from communications components (COMM) on the CAN or other network (e.g., radio modem, cellular modem, etc.), input from GNSS (global navigation satellite systems and/or related technology, including RTK) components (e.g., a GNSS receiver, RTK receiver, etc.) coupled to the CAN or other network, input from storage devices (e.g., memory, removable storage, persistent storage, etc.) coupled to the CAN or other network, among input from other devices. The user interface 88 includes one or any combination of a keyboard, joystick (e.g., with tactile motor), steering wheel, headset, mouse, microphone, display screen, touch-type or otherwise, among other types of input devices. Outputs may include signals to actuate the actuator(s) of the one or more control valves of the manifold 86, among other actuable devices and/or to provide operator feedback (e.g., visual, audible, and/or tactile) via corresponding devices (e.g., display screen and/or LEDs, speaker, tactile motor).

When certain embodiments of the computing system 26 are implemented at least in part as software (including firmware), as depicted in FIG. 5, it should be noted that the software can be stored on a variety of non-transitory computer-readable medium for use by, or in connection with, a variety of computer-related systems or methods. In the context of this document, a computer-readable medium may comprise an electronic, magnetic, optical, or other physical device or apparatus that may contain or store a computer program (e.g., executable code or instructions) for use by or in connection with a computer-related system or method. The software may be embedded in a variety of computer-readable mediums for use by, or in connection with, an instruction execution system, apparatus, or device, such as a computer-based system, processor-containing system, or other system that can fetch the instructions from the instruction execution system, apparatus, or device and execute the instructions.

When certain embodiment of the computing system 26 are implemented at least in part as hardware, such functionality may be implemented with any or a combination of the following technologies, which are all well-known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

FIGS. 6A and 6B illustrate various embodiments of a reel height adjustment system that, through application of at least the EPM module (FIG. 5), replaces or supplements the measurements of pressure and speed with electromagnetic-based crop feature detection (e.g., crop height) to trigger adjustments in reel movement. In FIGS. 6A and 6B, shown is a front portion of the windrower 10 including the cab 16 and the header 28 using stereoscopic imaging as one example functionality of the EPM module. The windrower 10 is depicted as advancing upon crop of a certain height (different in each figure for illustration). Referring to FIG. 6A, a stereoscopic imaging system 90 is positioned atop the cab 16. In one embodiment, the stereoscopic imaging system 90 is centrally mounted at the front of the cab 16. Note that the imaging system 90 may be part (e.g., optical) of the sensors 84 described in association with FIG. 5. In another embodiment, the stereoscopic imaging system 90 is disposed on the header 28, preferably centrally located atop the frame of the header 28. In some embodiments, the stereoscopic imaging system 90 may be disposed elsewhere on the windrower 10 or on the header 28. The stereoscopic imaging system 90 comprises a non-time-of-flight (TOF) imaging system, and may be embodied as multiple cameras residing within a single packaged unit. The cameras are offset from one another to image the crop at a slightly different angle to provide imaging results that are processed by an image processing component of the reel height adjustment software 82 (FIG. 5) to render a stereoscopic image. In some embodiments, the multiple cameras may each reside in a respective package at offset locations from each other to provide a similar effect. For instance, the imaging system 90 is generally mounted in a location within a range and view point that enables the capture of images (and/or located in any of a plurality of places on the windrower 10) of crop material located ahead of the header 28 that is coupled to the front of the windrower 10. Assuming the use of plural cameras, the cameras of the stereoscopic imaging system 90 are configured in one embodiment to operate in the visible light spectrum, and are depicted in this example as offset symmetrically across a longitudinal centerline of the windrower 10, although it is not necessary for the cameras of the stereoscopic imaging system 90 to be symmetrically offset or offset with respect to the centerline. The cameras are positioned to capture images of the crop material (e.g., uncut crops or weeds, or in some embodiments, cut crops) located proximal to, and in front of, the header 28 of the windrower 10. Note that other angles for image capture may be used, with the angles depicted in FIGS. 6A and 6B illustrative of two examples. The captured image may reveal one or more crop features, such as a height of the crops along all or a portion of a width of the header 28, the density, top-contour, and/or moisture content (e.g., via the color).

The pair of images captured by the cameras stereoscopic imaging system 90 are used by the reel height adjustment software 82 (FIG. 5) to produce stereo images and in some embodiments, a point cloud (or otherwise, three dimensional coordinates). Although described in the context of cameras operating in the visible spectrum, some embodiments of the stereoscopic imaging system 90 may operate in the non-visible spectrum, such as the infrared, ultraviolet, ultrasonic, among other ranges. Ultimately, the reel height adjustment software 82 uses the imaging input to determine at least the crop height and then adjust the reel height based on the reel height to maintain a consistent target load on the reel 30. In the case of the cab-mounted arrangement for the stereoscopic imaging system 90, the reel height adjustment software 82 determines the reel height based on a difference in the crop height and the header height. The operator sets the desired height of the reel 30 (e.g., to ensure the depth of the lowest portion of the reel 30 suitably engages the crop), and based on variations in the crop height as detected by the stereoscopic imaging system 90, the reel height adjustment software 82 adjusts the height of the reel. In one embodiment, height adjustment is based strictly on the imaging. In some embodiments, height adjustment may be based on a combination of determined load and one or more electromagnetic-based detection mechanisms. In some embodiments, the combination of inputs may be weighted, depending on the amount or integrity of data from each source.

In some embodiments, the reel height adjustment software 82 (FIG. 5, e.g., the EPM module) may use sensor input from a light strip in addition to, or in lieu of, other mechanisms for providing parameters for load determination. For instance, when replacing the pressure and speed sensing or the stereoscopic imaging, the light strip may be used to detect the height of the crop similar to what the stereoscopic imaging system 90 is attempting to achieve. Referring to FIG. 2C, shown in schematic are two primarily upright, extended-length light strips 92 on opposing sides of the header 20. Note that the light strips 92 may be part of the sensors 84 described in association with FIG. 5. The light strips 92 may comprise plural sources of light 92A (e.g., plural light transmitters or a single transmitter and optics to reflect the beam multiple times) along the length of one of the strips and receivers 92B along the length of the opposing strip. The light beams that travel across the header 20 from source 92A (e.g., transmitter) to receiver 92B provide a mechanism by which, upon interruption from crop breaking the beam of light of one or more beams, a determination of crop height (based on how many beams of light are interrupted) can be made by the reel height adjustment software 82. From this information, the reel height adjustment software 82 can determine (e.g., based on a LUT or parametric equation) what adjustments in reel height are required to maintain proper engagement of the reel 30 with the crop, with the adjustments made autonomously or via cooperation/intervention with the operator. The light strips 92 are mounted to the header 20 in such a manner that the crop height is best determined from interruption of the beams of light from standing crop as the windrower 10 advances along the field.

Note that these examples are merely illustrative, and that in some embodiments, reel height adjustment may be based on electromagnetic-based crop feature detection in lieu of, or in addition to, the load-based determination explained above. For instance, in some embodiments, one or more sensors may be mounted to the front of the header to measure relative capacitance, radiative reflectance, or relative absorbance of radio waves, microwaves, light, infrared, or other forms of radiation. The comparison of values at different heights provides an indication of an approximate crop height. This data may also provide other crop features, including crop moisture or nutrient data. In some embodiments, one or more cameras may be used with image processing and or machine learning software to determine one or more crop features, including crop height and/or contour of the crop.

In some embodiments, crop dividers comprising a tube or channel of plural capacitive moisture sensors may be used to detect moisture. Digressing briefly, many crops have a measureable amount of moisture that may be differentiated from the surrounding air. Individual, discrete sensing elements may be used. For instance, a single broadcast amplifier in cooperation with plural antennas may be used to receive a signal to determine crop height. In some embodiments, a delay line or mismatched impedance behavior using a pair of conductors running along the length of the tube may be used, and digital signal processing is implemented on any reflected pulses to enable a determination of the height without measuring actual moisture levels. In some embodiments, digital signal processing may be omitted in place of duplicate lines where one comprises a transceiver at one end and the other at the base.

Note that the reel height adjustment system may comprise all of the components shown in FIGS. 4A, 5, and 6A-6B, or a subset thereof in some embodiments, or additional components in some embodiments. The various embodiments described above may be used in any combination or alone in some embodiments.

Figure 7:
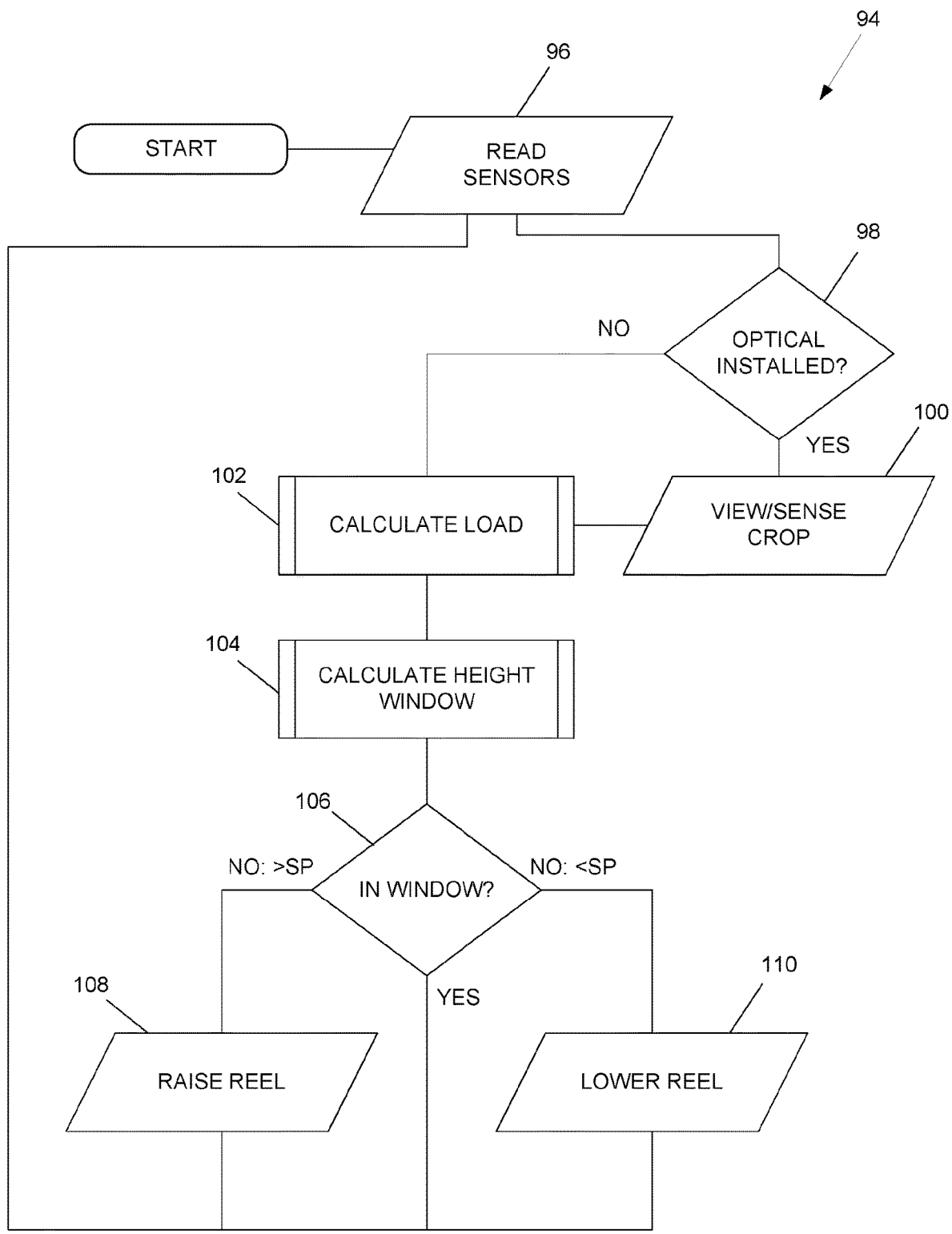
FIG. 7 is a flow diagram that illustrates an embodiment of an example control algorithm used in an embodiment of a reel height adjustment system.

Having described various embodiments of a reel height adjustment system, attention is now directed to FIG. 7, which illustrates an example control algorithm 94 used in an embodiment of a reel height adjustment system. In one embodiment, the control algorithm is implemented by the reel height adjustment software 82 running on one or more devices located on the windrower 10 (FIG. 1), such as on the computing system 26, residing on devices both internal and external to the windrower 10 in some embodiments, or in some embodiments, running on a device external to, yet in communication with, the control components of the windrower 10. In the depicted example control algorithm 94, upon commencement (start) of the algorithm, the control algorithm 94 reads sensors (96), and determines whether an optical sensor is installed (98). For instance, polling for (or generally receiving) locations or device identifiers coupled to the network (FIG. 5) enables the control algorithm 94 to determine if an electromagnetic-based crop feature detection device(s) (e.g., light strip or stereoscopic imaging system) is coupled to the network. In some embodiments, the availability of an optical sensor in the system may be acknowledged by an operator (e.g., via the user interface 88 (FIG. 5)). Note that, in some embodiments, the process may not commence, or decisions on the presence of certain sensors may not be initiated, until crop is detected or until the reel is commanded up or down.

Upon detection of an optical device, the crop is imaged (stereoscopic imaging system 90, FIG. 5, or sensed or detected, such as via light strips 92, FIG. 2C, capacitive sensors, moisture sensors, reflectance, radiating signal absorption, etc.) to determine crop height and/or other crop features. The load (target load) is determined (102), either based on the read sensors or the imaged/sensed crop or using a combination thereof, and a height window is calculated (104). Note that (102) may be calculated differently (e.g., ignored or smoothed or reset at baseline) if the reel is known to be out of crop or buried in crop. Then in (104), the algorithm 94 may choose to completely ignore one or more sensors if there is a determination that another sensor is more trustworthy. Self calibration may be running at some times or at all times. As the windrower 10 advances across the field, harvesting crop, and load conditions on the reel change, the control algorithm 94 determines whether the current load is within the window (106). If the current load is greater than a maximum setpoint, the reel is raised to attempt to bring the reel load (and pressure) back to the range of the window or the target load (108). If the current load is less than the minimum setpoint, the reel is lowered to attempt to bring the reel load (and pressure) back to the range of the window or the target load (110). Note that emphasis above for the algorithm 94 is on load-based sensing, though it should be appreciated by one having ordinary skill in the art in the context of the present disclosure that, should optical or other electromagnetic-based sensing be deployed, calculations may ignore or reduce the effect of the load calculations in some embodiments.

Figure 8:
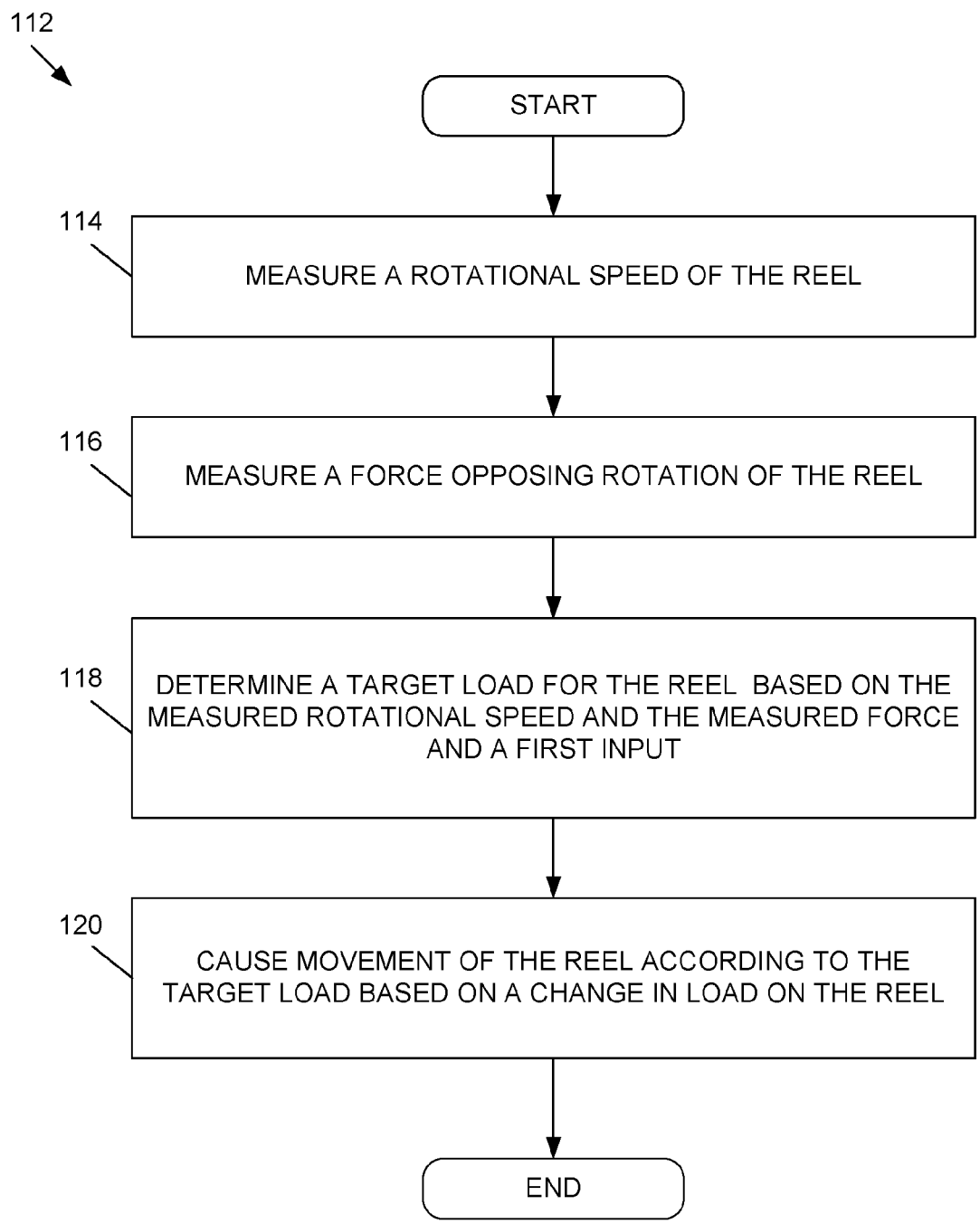
FIG. 8 is a flow diagram that illustrates an embodiment of an example reel height adjustment method.
Figure 9:
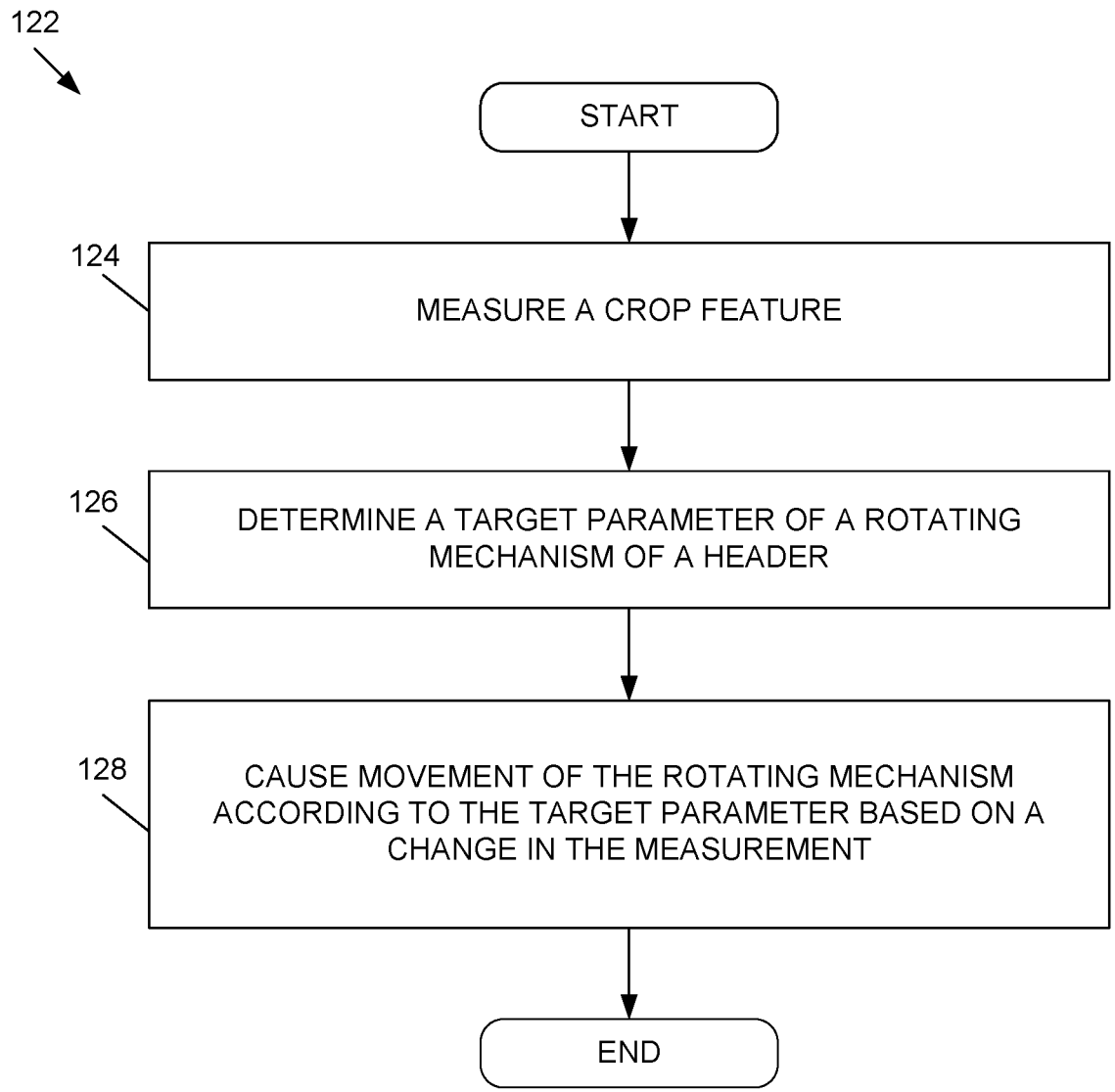
FIG. 9 is a flow diagram that illustrates another embodiment of an example reel height adjustment method.

In view of the above description, it should be appreciated that one embodiment of a reel height adjustment method 112, depicted in FIG. 8, which in one embodiment is implemented by the reel height adjustment software 82 (FIG. 5) as executed by one or more processors, comprises measuring a rotational speed of the reel (114); measuring a force opposing rotation of the reel (116); determining a target load for the reel based on the measured rotational speed and the measured force and a first input (118); and causing movement of the reel according to the target load based on a change in load on the reel (120). For instance, causing movement according to the target load includes reaching or approximating the target load. In some embodiments, a window with setpoints may also be determined for operation within the constraints of the window, causing said movement includes operation within the window.

In view of the above description, it should be appreciated that one embodiment of a reel height adjustment method 122, which in one embodiment is implemented by the reel height adjustment software 82 (FIG. 5) as executed by one or more processors, comprises measuring a crop feature (124); determining a target parameter of a rotating mechanism of a header (126); and causing a change in movement of the rotating mechanism according to the target parameter based on a change in the measurement (128). In one embodiment, the target parameter is a position of the rotating mechanism. In some embodiments, the target parameter is a speed of rotation of the rotating mechanism. In some embodiments, other and/or additional header components may be adjusted based on the target parameter and measurements.

Any process descriptions or blocks in flow diagrams should be understood as representing modules, segments, or portions of code which include one or more executable instructions for implementing specific logical functions or steps in the process, and alternate implementations are included within the scope of the embodiments in which functions may be executed out of order from that shown or discussed, including substantially concurrently or in reverse order, depending on the functionality involved, as would be understood by those reasonably skilled in the art of the present disclosure.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein. Although the control systems and methods have been described with reference to the example embodiments illustrated in the attached drawing figures, it is noted that equivalents may be employed and substitutions made herein without departing from the scope of the disclosure as protected by the following claims.

The invention claimed is:

1. A system, comprising:
a header, the header comprising:
a reel assembly comprising at least one reel;
plural carrier arms coupled to the reel; and
plural cylinders coupled to the plural carrier arms and configured to move the plural carrier arms; and
a control system, the control system comprising:
a first sensor configured to measure a rotational speed of the reel;
a second sensor configured to measure a force opposing rotation of the reel; and
a computing system configured to:
determine a target load for the reel based on first signals from the first and second sensors and a first input; and
cause movement of the reel according to the target load based on a change in load on the reel by actuating the plural cylinders.

2. The system of claim 1, wherein the reel assembly comprises a reel drive system configured to drive rotation of the reel.

3. The system of claim 2, wherein the first sensor is operatively coupled to the reel drive system and configured to measure the rotational speed of the reel by measuring a parameter corresponding to the rotational movement of the reel.

4. The system of claim 1, wherein the second sensor comprises one of a pressure transducer or load cell.

5. The system of claim 1, wherein the header comprises a draper or auger header.

6. The system of claim 1, wherein the reel assembly further comprises one or more additional reels.

7. The system of claim 1, wherein the computing system is further configured to:
determine a window surrounding the target load by determining a reel height window comprising minimum and maximum operational height and respective load values and within which the target load is achieved, wherein the computing system is configured to cause the movement of the reel within the reel height window based on second signals from the first and second sensors.

8. The system of claim 7, wherein the computing system is further configured to cause the movement by either causing the plural cylinders to raise the reel to reduce the load on the reel or lower the reel to increase the load on the reel.

9. The system of claim 7, wherein the computing system is configured to determine the target load based at least in part on the first input comprising one of operator input or historical data corresponding to a reel height setting.

10. The system of claim 7, wherein the computing system is configured to determine the target load based on one of access to a data structure arranged with pressure, speed, or load data or execution of a parametric equation, and further based on the first input comprising one of operator input or historical data corresponding to a reel height setting.

11. A computer-controlled method for adjusting a height of a header reel, the method comprising:
measuring a rotational speed of the reel;
measuring a force opposing rotation of the reel;
determining a target load for the reel based on the measured rotational speed and the measured force and a first input; and
causing movement of the reel according to the target load based on a change in load on the reel.

12. The method of claim 11, wherein measuring a rotational speed of the reel comprises measuring a parameter corresponding to the reel movement.

13. The method of claim 11, wherein measuring a force opposing rotation of the reel comprises measuring a driveline pressure.

14. The method of claim 11, further comprising measuring, measuring, determining, and causing for one or more additional reels.

15. The method of claim 11, further comprising determining a window surrounding the target load by determining a reel height window comprising minimum and maximum operational height values and respective loads within which the target load is achieved and causing the movement of the reel within the reel height window based on additional measurements for the rotational speed and the force.

16. The method of claim 15, further comprising causing by either raising the reel to reduce the load on the reel toward the target load or lowering the reel to increase the load on the reel toward the target load.

17. The method of claim 15, further comprising determining the target load based at least in part on one of operator input or historical data corresponding to a reel height setting.

18. The method of claim 15, further comprising determining the target load based on one of access to a data structure or execution of a parametric equation, and further based at least in part on one of operator input or historical data corresponding to a reel height setting.

19. A non-transitory computer readable medium encoded with instructions that cause one or more processors to:
receive a measurement for a rotational speed of a header reel;
receive a measurement for a force opposing rotation of the header reel;
determine a target load for the header reel based on the measured rotational speed and the measured force and a first input; and
cause movement of the header reel according to the target load based on a change in load on the header reel.

20. The non-transitory computer readable medium of claim 19, wherein the non-transitory computer readable medium is further encoded with instructions that cause the one or more processors to:
determine a window surrounding the target load by determining a reel height window comprising minimum and maximum operational height values and corresponding loads within which the target load is achieved and causing the movement of the reel within the reel height window based on additional measurements for the rotational speed and the force.

* * * * *